United States Patent
Narendran et al.

(10) Patent No.: US 8,027,308 B1
(45) Date of Patent: Sep. 27, 2011

(54) METHOD OF OPTIMIZING HANDOFF TIME IN A WIRELESS TELECOMMUNICATION NETWORK THROUGH DYNAMIC DATA SOURCE CONTROL

(75) Inventors: Rajveen Narendran, Olathe, KS (US); Andrew Mark Wurtenberger, Olathe, KS (US); Sreekar Marupaduga, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 940 days.

(21) Appl. No.: 11/925,263

(22) Filed: Oct. 26, 2007

(51) Int. Cl.
*H04W 36/00* (2009.01)
(52) U.S. Cl. ............ 370/331; 370/395.4; 455/436
(58) Field of Classification Search ............ 370/235, 370/328, 331, 395.4; 455/436–444, 446
See application file for complete search history.

(56) References Cited

U.S. PATENT DOCUMENTS

| | | | |
|---|---|---|---|
| 5,530,912 A | | 6/1996 | Agrawal et al. |
| 5,917,811 A | * | 6/1999 | Weaver et al. ............ 370/332 |
| 6,052,598 A | | 4/2000 | Rudrapatna et al. |
| 6,845,238 B1 | | 1/2005 | Muller |
| 7,042,858 B1 | * | 5/2006 | Ma et al. ............ 370/331 |
| 7,366,120 B2 | | 4/2008 | Handforth et al. |
| 7,848,241 B2 | | 12/2010 | Natarajan et al. |
| 2002/0068571 A1 | | 6/2002 | Ohlsson et al. |
| 2006/0252428 A1 | | 11/2006 | Agashe et al. |
| 2007/0022396 A1 | | 1/2007 | Attar et al. |
| 2009/0257361 A1 | | 10/2009 | Deshpande et al. |

OTHER PUBLICATIONS

Non-final office action issued in U.S. Appl. No. 11/950,777 on Jan. 3, 2011, 14 pages.
Christophoros Christophorou, et al.; "Radio Resource Management in MBMS Enabled 3G Mobile Cellular Networks: A New Handover Control Approach;" May 2, 2007; 7 pages; Department of Computer Science, University of Cyprus; Nicosia, Cyprus; www.ew2007.org/papers/1569014786.pdf.
Randy Battat; "1xEV-DO +VoIP =CDMA Operator Advantage;" CDMA Americas Conference; Sep. 2005; pp. 1-16; Airvana, Inc., Chelmsford, Massachusetts.
Paul Callahan; "Mobile VoIP over 1xEV-Do;" Airvana, Inc. Whitepaper; pp. 1-15; Airvana, Inc., Chelmsford, Massachusetts, 2006.
Sae-Young Chung, et al.; "Performance Evaluation of VoIP over EV-DO Rev A;" 8 pages; Department of EECS, South Korea; Airvana, Inc., Chelmsford, Massachusetts, 2004.
Ivan N. Vukovic; "Implementing VoIP over CDMA2000 1xEV-DO Rev A; Understanding System Performance and Requirements;" CDG Tech Forum on VoIP; Nov. 4, 2004; 13 pages; Motorola, Inc., Schaumburg, Illinois.

* cited by examiner

*Primary Examiner* — Seema S Rao
*Assistant Examiner* — Mon Cheri S Davenport

(57) ABSTRACT

The invention discloses a method of optimizing handoff time in a wireless communication system from a first base station to a second base station through a dynamic data source control, the method comprising determining a communication delay between a network service node of the wireless communication system and the second base station; setting a scheduling delay for the second base station; determining a handoff delay based on the communication delay and the scheduling delay and indicating said handoff delay to a mobile communication device, wherein the mobile communication device performs the handoff from the first base station to the second base station on expiry of the handoff delay so determined.

17 Claims, 4 Drawing Sheets

METHOD OF OPTIMIZING HANDOFF TIME IN A WIRELESS TELECOMMUNICATION NETWORK THROUGH DYNAMIC DATA SOURCE CONTROL

TECHNICAL FIELD

The invention is related to the field of communications, and in particular, to a method of optimizing the handoff outage time during cell switching of an Access Terminal in a wireless telecommunication network through dynamic data source control.

TECHNICAL BACKGROUND

Wireless communication systems have evolved drastically from the first voice-only cellular telephone systems to high-speed digital data networks capable of delivering voice, Internet, and even streaming video content to miniature handheld units that users carry with them and use as they travel.

In a typical cellular radio communication system (wireless telecommunication network), an area is divided geographically into a number of transmission areas, or cell sites, each of which is defined by one or more radio frequency (RF) radiation patterns from respective base transceiver station (BTS) antenna. The BTS of a cell may also be called an Access Point (AP) which implements functions of a BTS. A cell may refer to a coverage area serviced by an AP. A cell may further include one or more sectors.

When a non-stationary mobile user equipment also called an Access Terminal (AT), is positioned in a cell site, it communicates wirelessly with Access Points (APs). The APs communicate with a network service node of an Access Network (AN) of the telecommunication network.

An Active AT may have one or more sectors in its active set. An AP may have multiple sectors, making it possible for the active set to contain more than one sector for the same AP, or "cell". The AT receives forward link data from one sector at a time. The AT sends a signal to the AN via AP that indicates the best serving sector among the sectors in the active set. This signal is called the Data Rate Control (DRC) signal. The AT is said to "point" its DRC to the sector from which it may receive data next. The DRC signal also indicates to the AN the rate at which data should be sent to the AT. The AT generally varies the DRC signal based on measurements taken at the AT of one or more forward link signal parameters. Where the AP has multiple sectors, the AT may also identify in the DRC signal a specific sector from which the AP may transmit data to the AT. If the source and target sectors belong to the same AP, then the AT may switch between them without incurring any delay.

A wireless communication system permits an AT to move from the coverage area of one AP to that of another AP without losing the AT's connection with the AN. At any given time, the AT in a wireless network will typically be linked to a given sector and will be able to communicate with the telecommunication network via the AP serving that sector. The AN sends data from the AP at the rate requested by the AT. If the AT intends to move into a new sector of another AP, the AT attempts to switch from the first AP to the second AP serving the new sector. The process of rerouting data for an AT from a first AP to a second AP is called handoff. The AT sends a DRC signal requesting to switch the serving sector from a source sector in a first AP to a destination (target) sector in a second AP.

When the AT moves from the coverage area of one AP to another, the handoff process occurs because of the AT's transition from an initial sector of a cell site to a target sector of a different cell site. The AT may communicate with the new sector of second AP once the handoff process from the initial sector in the original AP to the target sector in the second AP is complete.

Wireless standards provide specifications that promote compatibility between various manufacturers of ATs and AN equipment. One such wireless standard for wireless high rate packet data (HRPD) systems, is as specified in "cdma2000 High Rate Packet Data Air Interface Specification," 3GPP2 C.S0024-0 Version 4.0, published in 2002, referred to herein as a "1xEV-DO (1x Evolution-Data Only) Release 0 network".

A soft handoff takes place when the AT switches from one sector to another sector in the same AP, or when the AT moves from one AP to another AP wherein the APs have a common frequency assignment. Soft handoff (handoff between two APs) switching causes a short period of outage. When the source and target sectors belong to different APs with different frequency assignment, during the AT handoff from one AP to another AP, the AT stops communicating with the first AP and starts communicating with the second AP after a certain time period (delay) sufficient for the AN to reroute forward link data to the second AP associated with the target sector in a hard handoff. The outage ranges from 100 milliseconds to as high as 200 milliseconds. This delay is because the AN takes time to re-route data packets targeted for the source BTS to the target BTS. Even though the AT has pointed its DRC to a sector of the second AP, the network will not be able to transport data to or from the AT through the second AP until after this delay or switch time.

For some applications, the handoff process or the rerouting process may result in a brief interruption in the data flow or data communication with the AT. Thus, handoff of an AT from a source AP to a target AP may interrupt signal transmission and reception between the AT and the AP, and may cause unacceptably long interruptions to services such as Voice over IP (VoIP), video telephony, network gaming, or other applications requiring high Quality of Service (QoS). Most de-jitter buffers on mobile VoIP handsets are able to handle 20-30 milliseconds delay and make it undetectable to the voice user on a call, but 100-200 milliseconds delay is beyond the capability of most de-jitter buffers and voice quality suffers.

The TIA-856-A standard, entitled "cdma2000 High Rate Packet Data Air Interface Specification," 3GPP2 C.S0024-A, published by the Telecommunications Industry Association in 2004, referred to herein as a "1xEV-DO Revision A network", describe methods of minimizing the duration of the interruption of data communication during handoff of an AT. The delay caused due to rerouting process of the AN is improved in revision A of the 1xEV-DO standard, with the introduction of a Data Source Control (DSC) switching. The forward sector switching in EV-DO is enhanced with the introduction of DSC channel. The DSC channel allows the AT to send an early indication of an impending handoff to the base station. The DSC signal is sent from the AT to the AN, and indicates the cell to which the AT will point its DRC after a specified delay time called "DSCLength". When an AP receives a DSC signal from an AT indicating that the AT will handoff to a new AP, the AP forwards the information to one or more entities in the AN through a Backhaul Connection. The AP then participates in the synchronous switching of routing of data to the AT. Thus, the DSC signal provides advance notification to the AN of the AT's intention to point its DRC at a sector belonging to the target cell, thereby minimizing the interruption in data flow to the AT caused by the handoff.

During BTS switching, the addition of DSC functionality enables the Access Network (AN) to send data packets to a target cell at almost the same time Access Terminal (AT) switches to target BTS, hence minimizing cell switching outage.

The DSCLength normally chosen is such that it provides sufficient time for the AN to reroute forward link data from the source AP to the target AP identified in the DSC signal. DSCLength is measured in slots. Alternatively, DSCLength may be measured in some other time differential, or may be identified by some other techniques such as by indicating an index into a lookup table of possible time periods.

Generally, AT uses a default value for DSCLength. Alternatively, the AN may also provide the DSCLength parameter to the AT prior to the DSC signal, to be used in the event of a switch to another AP. The AN may optionally adjust the DSCLength parameter used for handoff to be long enough to seamlessly switch to a sector of another AP. The AN sets the DSCLength to a relatively shorter value, if the AT needs to handoff to a target sector that is in the same cell as the source sector. In the event of AT performing a handoff to a target sector in a different cell than the source sector, the AN sets the DSCLength to a larger value to accommodate the longer time needed to reroute data to a different cell. After the time period specified in DSCLength passes, the AT directs its DRC signal to the target sector and it may then receive data from said target sector.

The "service outage" time during cell switching is dependent on the DSCLength which in turn is dependent on the Backhaul Delay (between the AN and BTS). DSCLength specifies the minimum time required prior to the AT switching cells. This time should be greater than the Backhaul Delay. However, if this time is much larger than the Backhaul Delay, the handoff outage is increased. Thus, although the interruption in the data flow caused by handoff is tried to be minimized by the AN adjusting the DSCLength, a challenge lies in reducing cell switching (handoff) outages which pose a problem for delay-sensitive applications, such as VoIP data. A short DSCLength is desirable to reduce the delay and possible service degradation due to bad channel conditions.

Accordingly, it would be desirable to reduce handoff outage between an AT and an AP, as much as can be possible.

TECHNICAL SUMMARY

Generally described, a method is provided for determining when a mobile communication device should perform a handoff from a first base station to a second base station in a wireless communication system. The method comprises determining a communication delay between a network service node of the wireless communication system and the second base station. The system establishes a scheduling delay for the second base station and determines a handoff delay based on the communication delay and the scheduling delay. The communication system indicates the handoff delay to the mobile communication device where the mobile communication device performs the handoff at a time determined by the handoff delay.

DETAILED DESCRIPTION

In order that the technical solution of the invention may be fully understood, one particularly preferred exemplary embodiment thereof will now be described with reference to the accompanying drawings.

Figure 1:
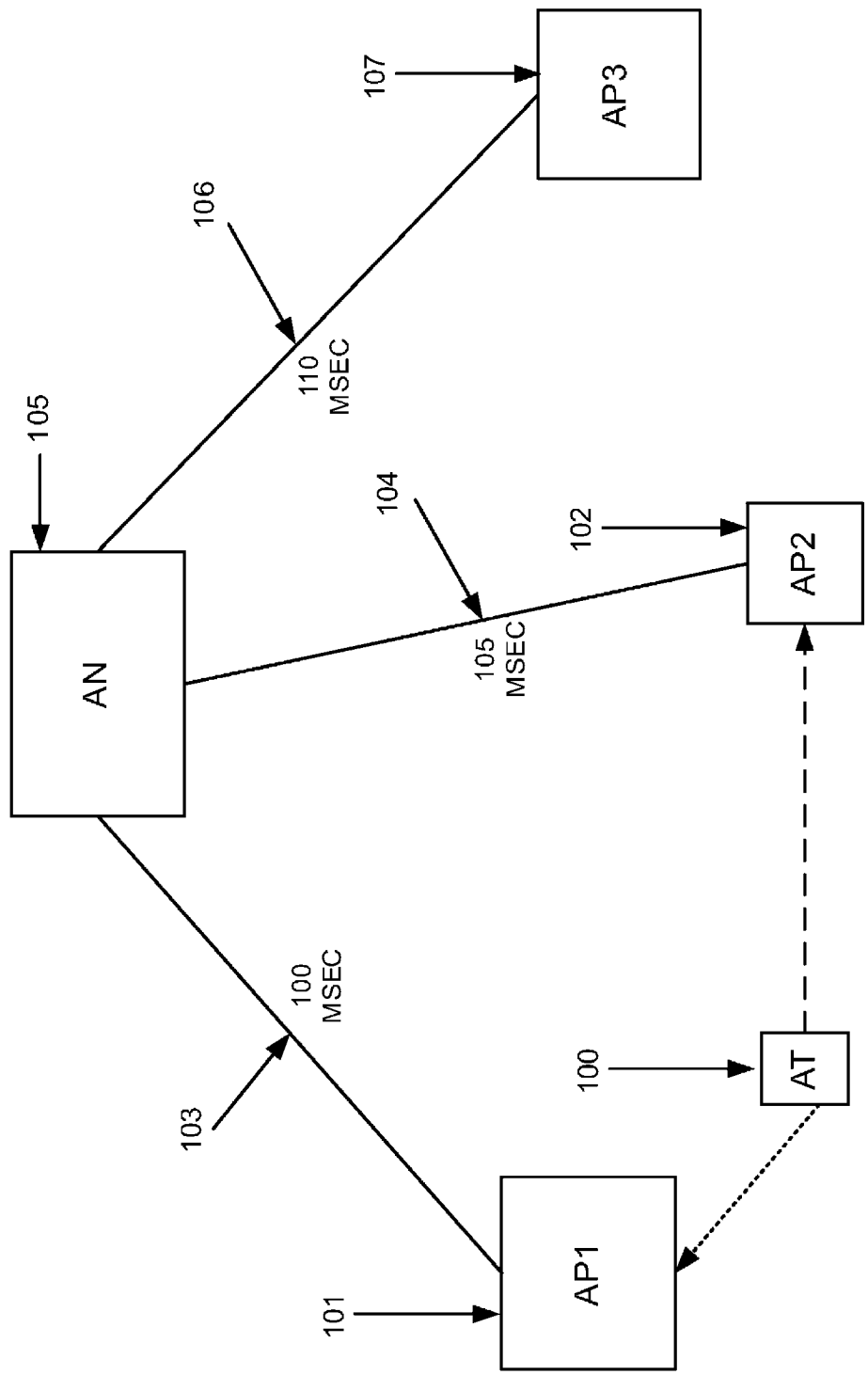
FIG. 1 is a block diagram of a wireless communication system of a 1xEV-DO Revision A Architecture.

FIG. 1 illustrates a block diagram of a wireless communication system of a 1xEV-DO Revision A Architecture, in accordance with an illustrative embodiment. By way of example, the wireless communication system is shown to include a wireless Access Network AN 105 connected by solid lines 103, 104 and 106 to three Access Points, Access Point 1 (AP1) 101, Access Point 2 (AP2) 102 and Access Point 3 (AP3) 107, respectively. Although, the AN in the embodiment of the invention has been illustrated to include three Access Points, it is obvious that the AN may include multiple Access Points, base station controllers, and switches connected to each other.

The Access Point may include a single-sector or multiple-sector wireless base station, hub, or other network transceiver. The system in FIG. 1 is also shown to include an Access Terminal AT 100 supported by said system. An AT typically provides a connection between a single user and the wireless Access Network.

The communication link through which an AT sends signals to APs in the AN is called a reverse link. The communication link through which APs send signals to an AT is called a forward link. The AT 100 may communicate with AP1 (101) and AP2 (102) on a forward link and/or a reverse link at a given moment.

In FIG. 1, AT 100 is a mobile station that is about to process a hard handoff from AP1 (101) to AP2 (102). The AT 100 is configured to generate a Data Source Control (DSC) signal for transmission to AN 105 indicating a handoff. In this process, AT 100 sends a DSC signal to AN 105 through AP1 (101) indicating the next serving sector as AP2 (102) to which it will point its DRC after a specified delay time of DSCLength. The AN 105 is configured to receive the DSC signal, and coordinates the timing of rerouting of user data necessitated by handoffs of the AT 100 from AP1 (101) to AP2 (102). Before AP2 (102) may transmit on the forward link to AT 100, the existing forward link channel between AP1 (101) and AT 100 must first be abandoned as the forward link utilizes only hard handoffs.

The DSCLength chosen should be such that it should provide sufficient time for the AN 105 to reroute forward link data from the source AP1 (101) to the target AP2 (102) identified in the DSC signal.

Figure 2:
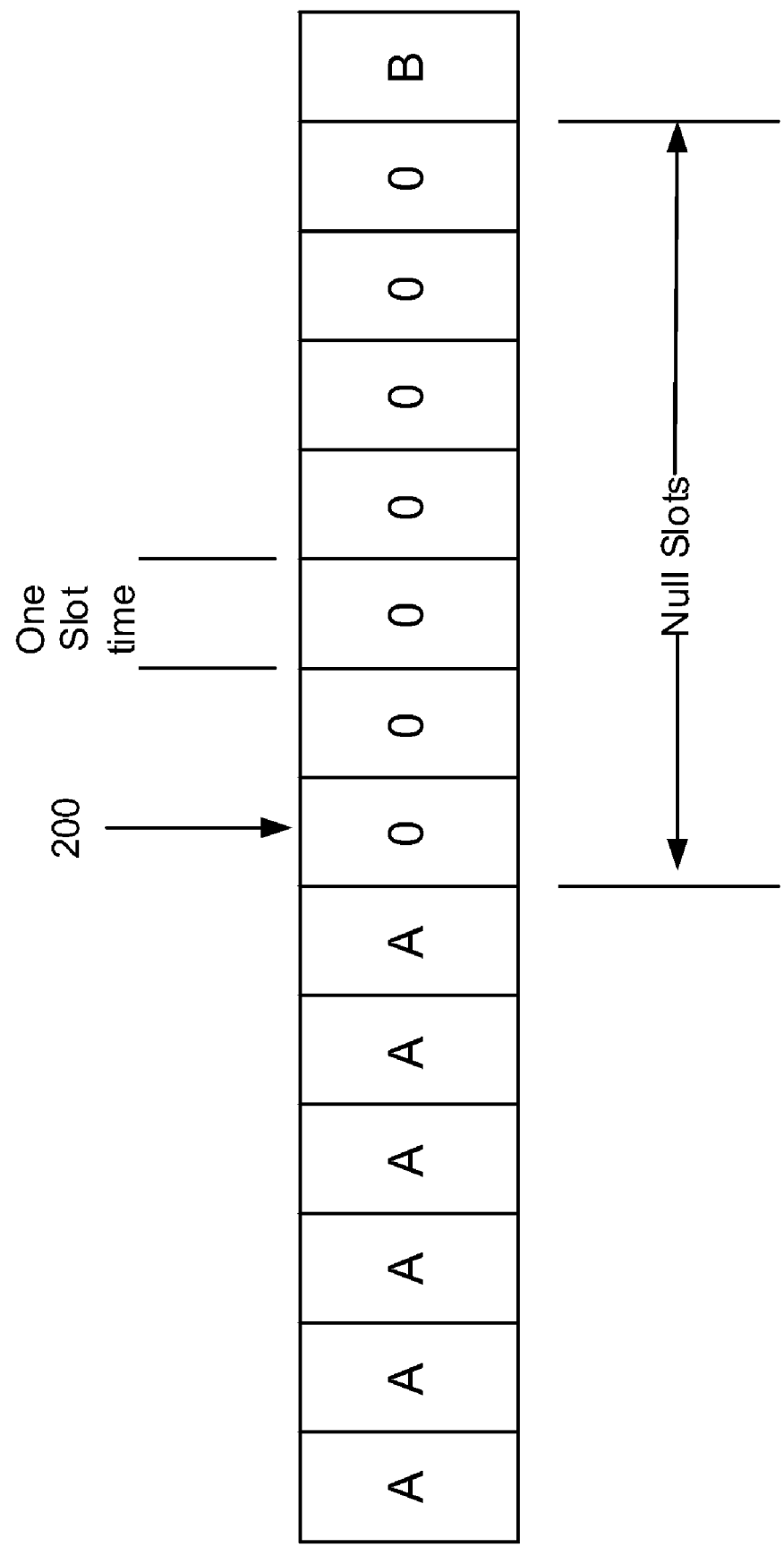
FIG. 2 shows a timeline of Data Source Control (DSC) handoff carried out in the system of FIG. 1.

FIG. 2 of the accompanying drawings illustrates a DSC handoff. It shows an embodiment of a timeline of DSC handoff in 1x EV-DO Revision A type wireless communication system of FIG. 1. Transmission on forward link is partitioned into a sequence of frames, each frame being further divided into time slots. The DSCLength parameter is shown being measured in unit of slots. Table 200 in FIG. 2 shows an Access Point "A" to Access Point "B" handoff in time slots, where "A" and "B" are cell A and cell B of the Access Point. "A" and "B" in the Table 200 indicate potential start of a new packet from cell A or cell B. The Null slots in the Table 200 indicate no new packet. The number of Null slots determine the delay time for the handoff from AP "A" to AP "B".

The DSC handoff timeline shown in FIG. 2 relates to the situation depicted in FIG. 1, where an AT attempts to process a hard handoff from cell A of active serving AP (or AP1 (101)) to cell B of next-serving AP (or AP2 (102)), resulting in switching its forward link serving access point from a source cell A to a target cell B.

The trigger for the AT 100 to switch its forward link serving access point may result from the forward link channel condition (e.g., the filtered signal-to-interference-and-noise (SINR) ratio from the target access point AP2 (102) being consistently improved than that from the source access point AP1 (101)).

DSC may be configured to have predetermined boundary at which DSC is allowed to change. Both the active serving AP and the target AP for the handoff are able to correctly detect the DSC change.

The serving access point AP1 (101) continues to send and receive data from the AT 100 until the expiration of the appropriate delay period, that is DSCLength. After the expiration of the appropriate delay period, AP1 (101) no longer sends data to, or receives data from, the AT 100.

At the end of handoff of AT 100 from AP1 (101) to AP2 (102), the AT 100 stops communicating with AP1 (101) and starts communicating with AP2 (102) at a given time point. The system determines when said time point should occur, that is, when the mobile station should perform the handoff from one AP to another, through a Dynamic Data Source Control (DSC) technique.

The Dynamic Data Source Control system improves the hard handoffs between Access Points. The invention provides a method of assessing a Dynamic DSC value that takes into account the AP to AN Backhaul Delay in milliseconds.

It is desired to set the DSCLength at a value which is little larger than the Backhaul Delay, but not so large that the handoff outage is increased.

Figure 3:
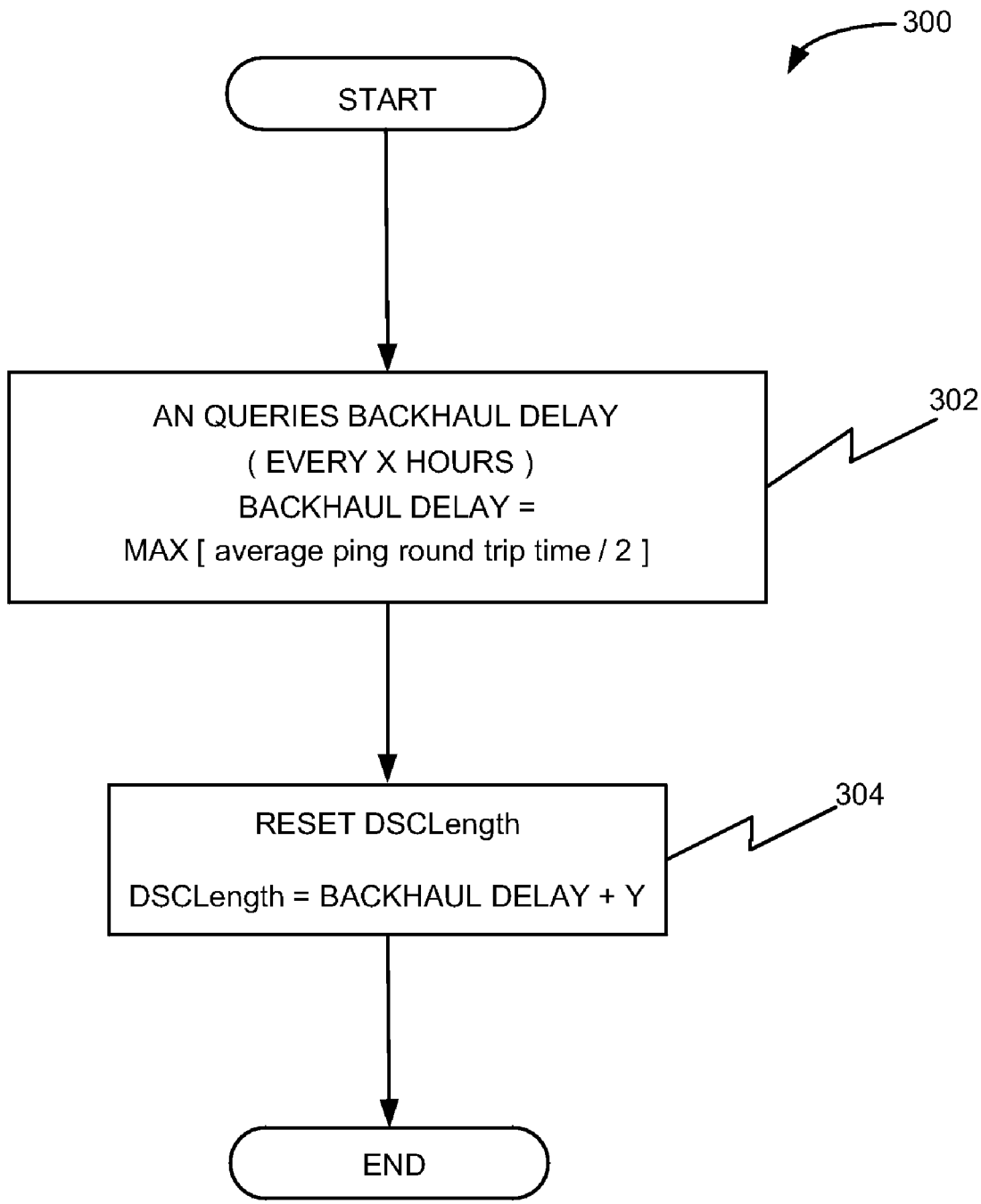
FIG. 3 is a flowchart depicting functional blocks of a method implemented by the embodiment of FIG. 1.

FIG. 3 illustrates a flowchart depicting functional blocks of a method, according to an embodiment of the present invention, implemented by the wireless communication system of FIG. 1. The method 300 includes having the network access node periodically measure the communication delay, for example, the Backhaul Delay, between the network access node (AN) and the base stations (AP or BTS) and to dynamically set the handoff delay (DSCLength) to a value that is little larger than the communication delay.

The Dynamic Data Source Control logic, employed herein, uses two operator settable parameters "X" and "Y" in the process. The "X" parameter is used to set how often the Access Network will calculate the Backhaul Delay between each AP and AN while the "Y" parameter is a value in milliseconds that will be used by the Dynamic Data Source Control process to ensure that the DSC value is set marginally larger than the Backhaul Delay.

The method 300 starts at block 302, where the Access Network (AN) queries Backhaul Delay periodically every 'X' hours. The Access Network measures Backhaul Delay by sending a series of Pings to all Access Points subtended to it.

The Backhaul Delay may be estimated as follows:

Backhaul Delay (milliseconds)=max [average ping round trip time/2]=Z    (1)

The round trip delay value (AN to AP) is halved and stored as the AP's "Z" parameter, as shown in (1) above.

Based on the Backhaul Delay 'Z' estimated in (1) above, Dynamic Data Source Control sets a value "N" for DSCLength dynamically at block 304, such that the DSC value is marginally larger than the calculated Backhaul Delay by a pre-set scheduling delay of "Y" milliseconds. DSCLength (N) is the number of milliseconds required for an error free handoff.

The handoff delay or DSCLength for an Access Point (AP) is calculated using the formula:

DSCLength (milliseconds)=Backhaul Delay+Y    (2), or

N=Z+Y, where Z is Backhaul Delay (in milliseconds) and Y is the number of time slots DSCLength is larger than Backhaul Delay.

Figure 4:
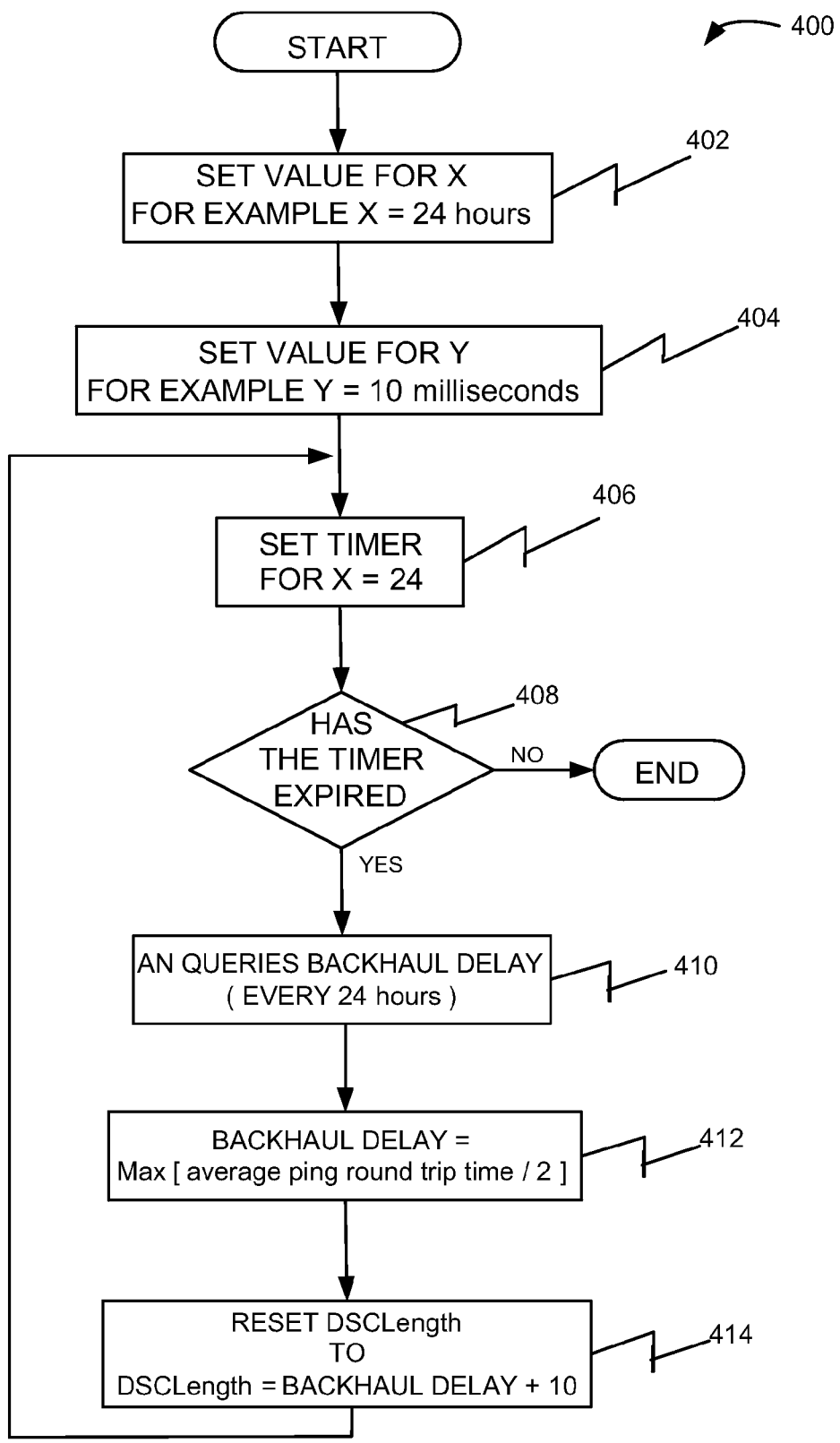
FIG. 4 is a flowchart explaining the method of FIG. 3.

'X' and 'Y' are operator settable parameters. An exemplary embodiment explaining the method of FIG. 3 is illustrated in FIG. 4. The method 400 starts at block 402, where a certain value is set for 'X', for example, X=24 hours. At block 404, a certain value for 'Y' is set, for example, Y=10 milliseconds. The AN uses the value of 'X' parameter to set a timer at block 406. The method continues via decision box 408, where the process checks whether the timer has expired. Once it is determined that the timer has expired, the AN queries for Backhaul Delay at block 410 and calculates the current Backhaul Delay for the AP at block 412. The AN calculates the Backhaul Delay after every 24 hours in this exemplary illustration. The method continues to block 414 where it calculates the DSCLength to be equal to the sum of the Backhaul Delay estimated at block 412 and the value of the parameter 'Y' set at block 404 and resets the DSCLength.

The value of "N" obtained through Dynamic Data Source Control as above, is used in the calculation of the number of time slot shown in FIG. 2, that will be set by the Data Source Control message, prior to the AT switching cells.

Data Source Control is defined in TIA-856A and 3GPP2 C.S0024-A v1.0 specifications. These documents define the DSC process, messages and attributes for Data Source Control which is incorporated here as a reference.

In FIG. 1 of the drawings, the Link 103 from AN 105 to AP1(101) has a 100 MSEC (Milliseconds) delay, Link 104 from AN 105 to AP2(102) has a 105 MSEC (Milliseconds) delay and Link 106 from AN 105 to AP3(107) has a 110 MSEC (Milliseconds) delay. Thus, each of the APs [AP1 (101), AP2(102) and AP3(107)] would have a different Data Source Control value "N" for its handoff. Accordingly, for the exemplary embodiment of the invention illustrated in FIG. 1, the number of milliseconds required for an error free handoff in case of each of the three APs would be 100+10=110 msec - - - in case of AP1 (101),    i.

105+10=115 msec - - - in case of AP2 (102) and    ii.

110+10=120 msec - - - in case of AP3 (107).    iii.

Alternatively, AN 105 may take each of the AP Backhaul Delay values and create an average network communication delay for the entire network and utilize this Backhaul Delay value to create a DSCLength that can be used for all of the APs (i.e. AP1 101, AP2 102 and AP3 107) in the network. For example, the Backhaul Delay may be estimated as follows for the network illustrated in FIG. 3:

Backhaul Delay (milliseconds)=max [(AP1 average ping round trip time/2+AP2 average ping round trip time/2+AP3 average ping round trip time/2)/ 3]=Z    (3)

It should be understood that the arrangements described herein are set forth for purposes of example only, and other arrangements and elements can be used. Further, as in most telecommunication applications, those skilled in the art will appreciate that many of the elements described herein are functional entities that may be implemented as hardware, firmware and/or software, and as discrete components, in any suitable combination and location.

What is claimed is:

1. A method of determining when a mobile communication device should perform a handoff from a first base station to a second base station, the method comprising:
    determining a backhaul delay between a network service node and the second base station wherein the backhaul delay comprises an amount of time that communications are delayed between the network service node and the second base station;
    establishing a scheduling delay for the second base station wherein the scheduling delay comprises a preset time period;
    determining a handoff delay based on the backhaul delay and the scheduling delay wherein the handoff delay comprises an amount of time for delaying the handoff from the first base station to the second base station; and
    indicating the handoff delay to the mobile communication device, wherein the mobile communication device performs the handoff from the first base station to the second base station at a time controlled by the handoff delay.

2. The method of claim 1 wherein the determining of the backhaul delay comprises pinging the second base station by the network service node with a data packet, calculating a roundtrip travel time of the data packet between the network service node and the second base station, and dividing the roundtrip travel time by two.

3. The method of claim 2 wherein the backhaul delay is determined periodically at a predetermined interval.

4. The method of claim 3 wherein the predetermined interval is 24 hours.

5. The method of claim 1 wherein determining the backhaul delay comprises determining an average network communication delay between the network service node and a plurality of base stations.

6. The method of claim 5 wherein determining the network communication delay comprises:
    pinging the plurality of base stations by the network service node with data packets;
    calculating a plurality of roundtrip travel times of the data packets between the network service node and the plurality of base stations;
    dividing each of the plurality of roundtrip travel times by two to create a plurality of one-way travel times;
    adding the plurality of one-way travel times; and
    dividing the addition of the plurality of one-way travel times by a number of the plurality of base stations.

7. The method of claim 1 wherein determining the handoff delay comprises summing the backhaul delay and the scheduling delay.

8. The method of claim 1 wherein the backhaul delay comprises a delay between an access network and an access point.

9. The method of claim 8 wherein the access network measures the backhaul delay by sending a series of pings to all access points subtended to it.

10. The method of claim 9 wherein determining the backhaul delay comprises using the following formula:

$$\text{backhaul delay (milliseconds)} = \max\left[\text{average ping round trip time}/2\right].$$

11. The method of claim 1 wherein the scheduling delay comprises a predetermined number of time slots wherein the time slots are measured in milliseconds.

12. The method of claim 1 wherein determining the handoff delay further comprises converting the handoff delay from milliseconds to time slots.

13. The method of claim 1 wherein indicating the handoff delay to the mobile communication device comprises indicating the handoff delay in a number time slots.

14. The method of claim 1, wherein the handoff delay is a Dynamic Data Source Control value of DSCLength in milliseconds.

15. The method of claim 14 wherein the DSCLength is calculated by using the formula:

$$\text{DSCLength} = \text{backhaul delay} + \text{scheduling delay}.$$

16. The method of claim 14 wherein the DSCLength is measured in time slots in a timeline of DSC handoff.

17. The method of claim 1, wherein the handoff delay is used in a calculation of a number of time slots that will be signaled by a Data Source Control prior to the mobile communication device performing the handoff from the first base station to the second base station.

* * * * *